(12) United States Patent
Koyama

(10) Patent No.: US 9,381,898 B2
(45) Date of Patent: Jul. 5, 2016

(54) ACTUATOR FOR BRAKE FLUID PRESSURE CONTROL

(71) Applicants: DENSO CORPORATION, Kariya, Aichi-pref. (JP); Advics Co., Ltd., Kariya, Aichi-pref. (JP)

(72) Inventor: Fumitoshi Koyama, Kariya (JP)

(73) Assignees: DENSO CORPORATION, Kariya, Aichi-pref (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 14/631,035

(22) Filed: Feb. 25, 2015

(65) Prior Publication Data

US 2015/0239443 A1 Aug. 27, 2015

(30) Foreign Application Priority Data

Feb. 26, 2014 (JP) ................................. 2014-035820

(51) Int. Cl.
*B60T 8/34* (2006.01)
*B60T 8/36* (2006.01)

(52) U.S. Cl.
CPC .. *B60T 8/34* (2013.01); *B60T 8/368* (2013.01)

(58) Field of Classification Search
CPC ....... B60T 7/042; B60T 8/4077; B60T 8/885; B60T 13/146; B60T 13/66; B60T 13/662; B60T 13/686

See application file for complete search history.

(56) References Cited

U.S. PATENT DOCUMENTS

| 5,766,026 | A | * | 6/1998 | Cooper | B60R 16/0239 361/736 |
| 6,164,732 | A | * | 12/2000 | Tominaga | B60T 15/028 303/115.2 |
| 6,354,674 | B1 | * | 3/2002 | Iwamoto | B60T 8/368 303/119.3 |
| 6,875,029 | B2 | * | 4/2005 | Kawabata | B60R 16/0239 439/76.2 |
| 7,158,372 | B2 | * | 1/2007 | Sanada | H05K 3/308 137/557 |
| 2004/0032164 | A1 | * | 2/2004 | Tsunooka | B60T 8/3675 303/119.3 |
| 2012/0298897 | A1 | * | 11/2012 | Nakamura | B60T 8/3675 251/129.15 |

FOREIGN PATENT DOCUMENTS

| JP | 08-162779 | 6/1996 |
| JP | 10-173349 | 6/1998 |
| JP | 2006-245143 | 9/2006 |
| JP | 2009-200115 | 9/2009 |
| JP | 2012-241845 | 12/2012 |
| JP | 2013-229607 | 11/2013 |

* cited by examiner

Primary Examiner — Vishal Sahni
(74) Attorney, Agent, or Firm — Harness, Dickey & Pierce, P.L.C.

(57) ABSTRACT

An actuator for brake fluid pressure control includes a block formed with a brake pipe, an electric component provided on a surface of the block, a circuit board formed with an electric circuit for driving the electric component, and a case that houses the circuit board and includes a first open part in which the electric component is accommodated, the case having a top surface opposite the surface of the block across the circuit board and being fixed to the block at the side opposite to the top surface. An insertion hole is formed in a side surface of the case at a position corresponding to a plane position of the circuit board. The insertion hole is sized to enable inserting the circuit board into the case therethrough to be fixed to the case.

7 Claims, 5 Drawing Sheets

ACTUATOR FOR BRAKE FLUID PRESSURE CONTROL

This application claims priority to Japanese Patent Application No. 2014-35820 filed on Feb. 26, 2014, the entire contents of which are hereby incorporated by reference.

BACKGROUND OF THE INVENTION

1. Field of the Invention

The present invention relates to an actuator for brake fluid pressure control.

2. Description of Related Art

There is known an actuator for brake fluid pressure control having a structure where a circuit board, on which various electric components for brake fluid pressure control such as electric circuits for driving electromagnetic valves or a motor and an electronic control unit including electronic parts are mounted, is fixed integrally to a block to which a fluid pressure circuit and various electric components are assembled. The circuit board and the electronic parts are covered by a case for preventing them from being flooded. Part of the case is extended laterally beyond an edge of the block, and a connector connected to the circuit board is disposed in this extended part to enable electrical connection between the circuit board and the outside through this connector.

More specifically, the case is formed with a first open part in which the various electric components are accommodated and a second open part in which the connector is disposed, and is fixed to the block on the side of the first open part so that the connector can be electrically connected to the outside through the second open part. For example, refer to Japanese Patent Application Laid-open No. 2012-241845.

However, the above conventional actuator for brake fluid pressure control has a problem in that the circuit board cannot be assembled to the inside of the case through the open part of the case, because the circuit board has a size laterally extending from the block to the connector disposed in the extended part of the block. Accordingly, conventionally, the case is divided into a cover part and a frame part, the cover part constituting a surface opposite to the block and parallel to the circuit board, the frame part constituting the first and second open parts.

However, when the case is divided as described above, the cover part and the frame part have to be joined together through a packing, or have to be welded together using vibration welding or the like to provide a wide area sealing to ensure liquid-tightness of the inside of the case. Accordingly, there have been a problem that equipment for performing vibration welding or the like is needed, and a problem that it is difficult to ensure uniform sealing over the wide area.

SUMMARY

An exemplary embodiment provides an actuator for brake fluid pressure control including:

a block formed with a brake pipe;

an electric component provided on a surface of the block;

a circuit board formed with an electric circuit for driving the electric component; and a case that houses the circuit board and includes a first open part in which the electric component is accommodated, the case having a top surface opposite the surface of the block across the circuit board and being fixed to the block at the side opposite to the top surface, characterized in that an insertion hole is formed in a side surface of the case at a position corresponding to a plane position of the circuit board, the side surface being constituted by a wall surface extending from an outer edge of the top surface toward the block, the insertion hole being closed by a lid pat, and the insertion hole is sized to enable inserting the circuit board into the case therethrough to be fixed to the case.

According to the exemplary embodiment, there is provided an actuator for brake fluid pressure control which enables inserting a circuit board into a case thereof while eliminating the need of a wide area sealing.

Other advantages and features of the invention will become apparent from the following description including the drawings and claims.

PREFERRED EMBODIMENTS OF THE INVENTION

Figure 1:
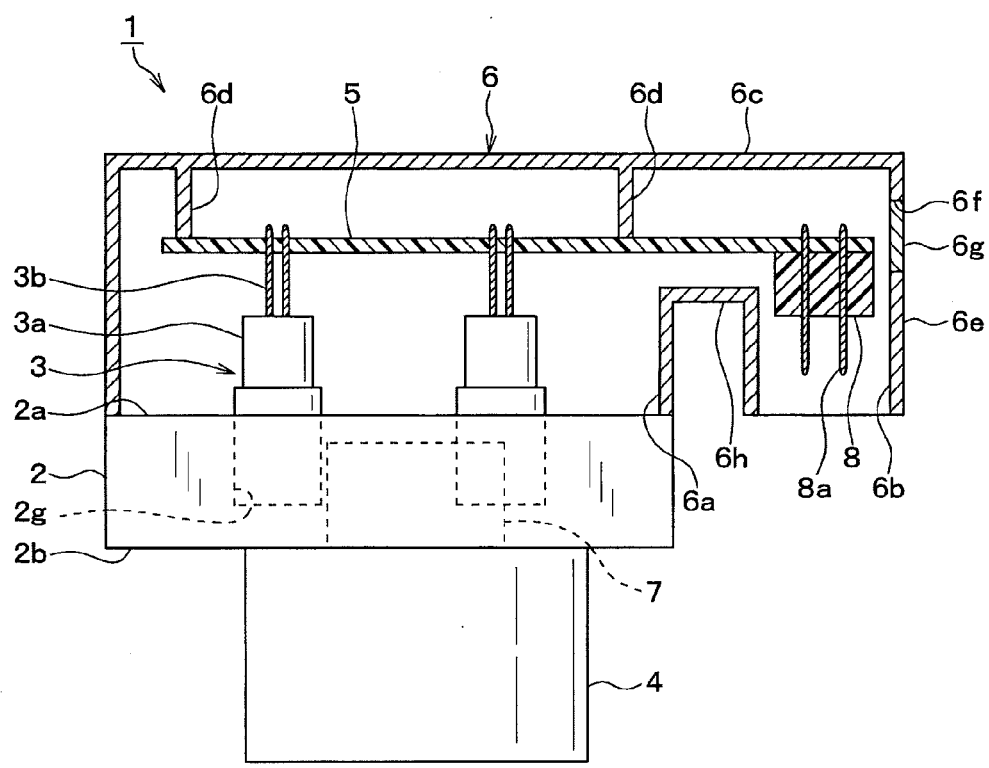
FIG. 1 is a partially cross-sectional side view of an actuator for brake fluid pressure control according to a first embodiment of the invention.

In the embodiments described below, the same of equivalent components or parts are indicated by the same reference numerals or characters.

First Embodiment

FIG. 1 is a partially cross-sectional side view of an actuator 1 for brake fluid pressure control according to a first embodiment of the invention. This actuator 1 is disposed between a master cylinder and a wheel cylinder of a vehicle brake unit for controlling a brake fluid pressure applied to the wheel cylinder.

As shown in FIG. 1, the actuator 1 includes a block 2, various components for brake fluid pressure control such as electromagnetic valves 3 and a motor 4, a circuit board 5 and a case 6.

The block 2 is formed with a brake pipe (not shown) for fluid pressure control. In this embodiment, the block 2 is made of metal such as aluminum, and formed in a rectangular shape including a surface 2a on which at least the electromagnetic valves 3 are fixed, and a surface 2b which is opposite to the surface 2a and on which the motor 4 is fixed.

The electromagnetic valves 3 are arranged on the surface 2a. Each electromagnetic valve 3 is fitted into a recess 2g formed in the surface 2a of the block 2 at its part other than its coil unit 3a. The electromagnetic valves 3 can be fixed to the block 2 by swaging part of the block 2. The coil unit 3a is disposed outside the block 2. Terminals 3b connected to a solenoid coil incorporated in the coil unit 31 are drawn outside the coil unit 3a. The solenoid coil can be supplied with current by electrically connecting the terminals 3b to the circuit board 5.

The coil unit 3a of the electromagnetic valve 3 is detachable from the other part of the electromagnetic valve 3. Accordingly, it is possible that only the coil unit 3a is connected to the circuit board 5 first, and then the other part of the electromagnetic valve 3 fixed to the block 2 is combined to the coil unit 3a.

The motor 4 is fixed to the surface 2b of the block 2. The block 2 incorporates a pump 7. The brake fluid pressure can be controlled by driving the motor 4 to cause the pump 7 to suck or discharge a brake fluid. Although not shown in the drawings, the motor 4 is electrically connected to the circuit board 5 through a cable which is inserted into a through hole penetrating between the surfaces 2a and 2b of the block 2 and drawn to the surface 2a opposite to the surface 2b on which the motor 4 is disposed.

Further, although not shown in the drawings, other than the electromagnetic valves 3 and the motor 4, a pressure sensor for detecting the pressure of the master cylinder is assembled to the block 2. The electromagnetic valves 3 and the pressure sensor 4 are covered by the case 6.

The circuit board 5 is provided with electric circuits for driving various electric components including the electromagnetic valves 3, the motor 4 and so on. The circuit board 5 extends outside the block 2 when viewed from the downside of FIG. 1 (in the direction normal to the surfaces 2a and 2b of the block 2). A connector 8 including a plurality of terminals 8a is fixed to the connector 8 at outside the block 2. The terminals 8a of the connector 8 are electrically connected respectively to the electric circuits provided in the circuit board 5 to enable electrical connection and data exchange with the outside through the connector 8. Although not shown in FIG. 1, a brake ECU (Electronic Control Unit) for controlling driving of the electric components is mounted. In this embodiment, the brake ECU controls various electronic components based on various signals received from the outside through connector 8 and detection signals from the pressure sensor and so forth to perform brake fluid pressure control.

The case 6 is formed with an open part 6a corresponding to the block 2 and an open part 6b corresponding to the connector 8 at one surface thereof. The case 6 is fixed to the block 2 in a state of incorporating therein the circuit board 5 so as to watertightly cover the various electronic components.

More specifically, the open part 6a is formed in a shape corresponding to that of the surface 2a of the block 2, for example, in a rectangular shape. The case 6 is fixed to the block 2 such that the various electronic components fixed to the surface 2a of the block 2 are accommodated within the open part 6a. Although not shown in the drawings, the case 6 is formed with screw-fastening holes at four corners of the open part 6a, and the block 2 is formed with female screw holes at four corners of the surface 2a so that the case 6 can be fixed to the block 2 by screwing the female screw holes.

The open part 6b is located outside the block 2 when viewed from the downside of FIG. 1. The connector 8 is exposed outside the block 2 to enable electrical connection between the connector 8 and the outside through the open part 6b.

The case 6 includes also a surface (top surface) 6c opposite to the surface 2a of the block 2 across the circuit board 5. The circuit board 5 is disposed so as to be parallel to this surface 6c. The case 6 includes a plurality of stays 6d formed so as to project from the inner wall of the surface 6c. The circuit board 5 is fixed to the case 6 in a state of being supported by the stays 6d. The circuit board 6 may be formed with holes at positions corresponding to the positions of the stays 6d so that the circuit board 5 can be fixed to the case 6 by press-fitting or fusion-joining the end portions of the stays 6d into these holes. Alternatively, the stays 6d may be formed with female screw holes so that the circuit board 5 can be fixed to the case 6 by screwing the female screw holes from the surface opposite to the stays 6d of the circuit board 5.

An wall surface of the case 6, which extends from the outer edge of the surface 6c toward the block 2, that is, a side surface 6e parallel to the normal direction of the surface 2e of the block 2 is formed with an insertion hole 6f which opens at a position corresponding to the plane position of the circuit board 5. Specifically, the insertion hole 6f is formed penetrating through the side surface 6e at the side of the connector 8. The insertion hole 6f is sized to receive the circuit board 5 thereinto. The circuit board 5 is inserted into the insertion hole 6f to be housed in the case 6.

A lid part 6g is provided so as to close the insertion hole 6f. The lid part 6g is fitted into the insertion hole 6g in a state of a sealing member being disposed around the periphery of the lid part 6g to ensure liquid tightness between the lid part 6g and the insertion hole 6f. The lid part 6g may be fixed to the insertion hole 6f by welding. However, since the lid part 6g is small in size, it can be fixed to the insertion hole 6g by press fitting.

Incidentally, since the case 6 includes a partition wall 6h between the open parts 6a and 6b, it is difficult to insert the circuit board 5 into the case 6 through the open part 6a because of interference between the circuit board 5 and the partition wall 6h.

The case 6 may be made of resin. Alternatively, it may be made of metal if insulation between the electric circuits formed in the circuit board 5 and the case 6 can be ensured. For example, by avoiding wiring patterns of the electric circuits from being formed on areas which are to be in contact with the stays 6d, it is possible to ensure insulation between the electric circuits and the case 6. When the case 6 is made of metal having better heat conductivity than resin, the heat generated by the brake ECU, electromagnetic valves 3 and so forth mounted on the circuit board 5 can be dissipated more from the case 6 than when the case 6 is made of resin. Accordingly, when the case 6 is made of metal, it is possible to increase the heat dissipation of the actuator 1.

Next, a method of manufacturing the actuator 1 for brake fluid pressure control described above is explained with reference to FIGS. 2 and 3.

Figure 2A:
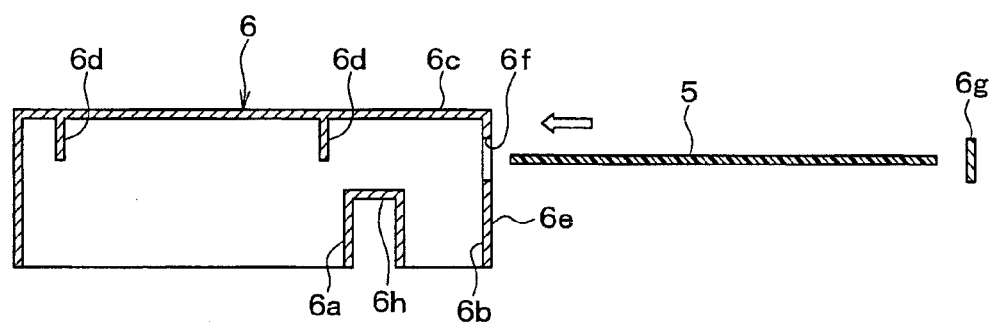
FIG. 2A is a diagram showing the actuator in a manufacturing process step.
Figure 3:
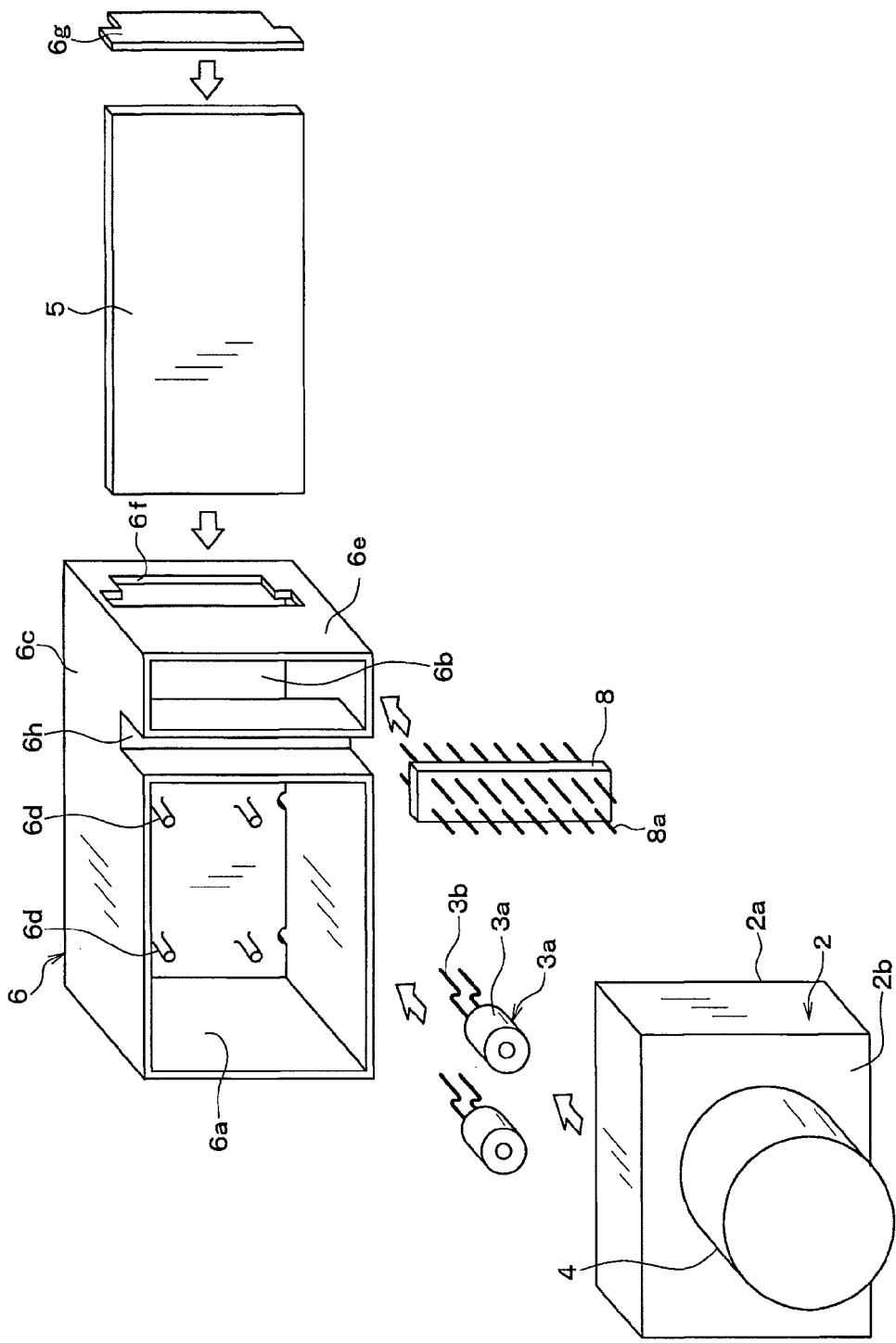
FIG. 3 is an exploded perspective view of the actuator.

As shown in FIGS. 2A and 3, the circuit board 5 is inserted into the case 6 from the insertion hole 6f not closed by the lid part 6g. Thereafter, the circuit board 5 is fixed to the stays 6d of the case 6, and then the insertion hole 6f is closed by the lid part 6g. At this time, the lid part 6g may be fitted into the insertion hole 6g in a state of a sealing member being disposed around the periphery of the lid part 6g. In this case, it is possible to eliminate the need for preparing equipment for performing vibration welding or the like. Since the lid part 6g is relatively small, it is not necessary to seal the whole of the outer edge of the cover part constituting the surface opposite to the circuit board 5 (the surface 6c of the case 6 in this embodiment) unlike in the conventional case, uniform sealing can be achieved easily.

Figure 2B:
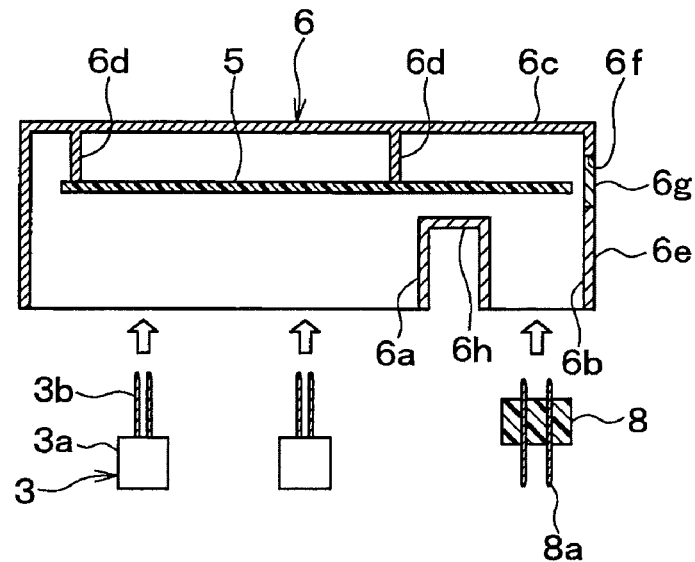
FIG. 2B is a diagram showing the actuator in a manufacturing process step following FIG. 2A.

Next, as shown in FIG. 2B and FIG. 3, the coil units 3a are inserted into the case 6 from the open part 6a, and then the terminals 3b are electrically connected to the electric circuits formed on the circuit board 5. The circuit board 5 may be formed with through holes in advance. In this case, metal platings within the through holes can be electrically connected to the terminals 3b by press fitting. Subsequently, the connector 8 is inserted into the case 6 from the open part 6b, and the terminals 8a of the connector 8a are electrically connected to the electric circuits formed on the circuit board 5. Electrical connection between the terminals 8a and the electric circuits formed on the circuit board 5 can be done in the same way as the terminals 3b.

Figure 2C:
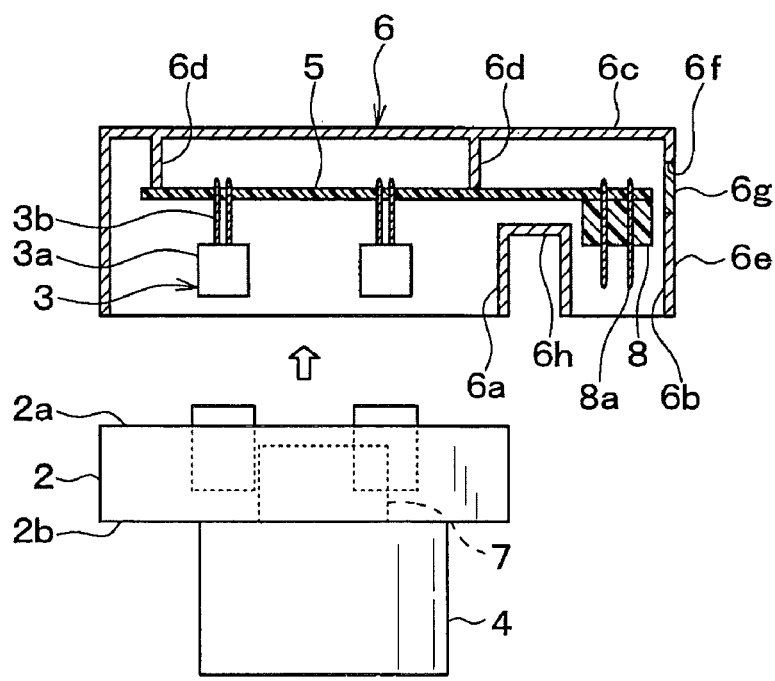
FIG. 2C is a diagram showing the actuator in a manufacturing process step following FIG. 2B.

Next, as shown in FIGS. 2C and 3, the block 2 assembled with the motor 4 and the electromagnetic valves 3 excluding the coils units 3a is disposed so as to close the open part 6a. At this time, although not shown in the drawings, the case 6 is fixed to the block 2 by screwing female-screw holes formed at the four corners of the block 2 through screw-fastening holes formed in advance at the four corners of the open part 6a of the case 6. In this way, the actuator 1 for brake fluid pressure control shown in FIG. 1 is completed.

As explained above, the actuator 1 for brake fluid pressure control according to this embodiment is configured such that the circuit board 5 can be housed in the case 6 through the insertion hole 6f as a lateral through hole formed in a side surface of the case 6. The case 6 can be made liquid-tight by closing the insertion hole 6f by the lid part 6. Accordingly, it is not necessary to seal the whole of the outer edge of the cover part constituting the surface opposite to the circuit board 5 (the surface 6c of the case 6 in this embodiment).

That is, the actuator 1 is configured such that the circuit board 5 can be housed in the case 6 without requiring sealing across a wide area.

Further, if the lid part 6g is fitted into the insertion hole 6g in a state of a sealing member being disposed around the periphery of the lid part 6g, it is possible to eliminate the need for preparing equipment for performing vibration welding or the like.

Modification of First Embodiment

Figure 4:
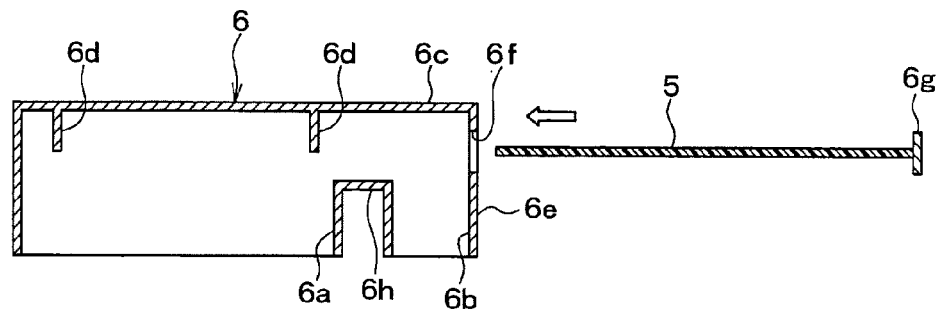
FIG. 4 is a diagram showing a modification of the actuator in a manufacturing process step.
Figure 5:
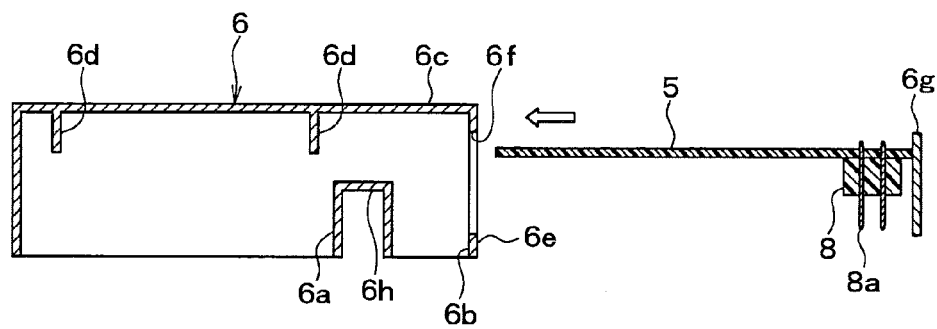
FIG. 5 is a diagram showing another modification of the actuator in a manufacturing process step.

In the first embodiment, the circuit board 5 and the lid part 6g are separate members. However, as shown in FIG. 4, the lid part 6g may be integrally fixed to one end of the circuit board 5, so that the lid part 6g is inserted into the insertion hole 6f together with the circuit board 5. Further, as shown in FIG. 5, the lid part 6g may be integrally fixed to one end of the circuit board 5 connected with the connector 8, so that the lid part 6g is inserted into the insertion hole 6f together with the circuit board 5 and the connector 8.

Second Embodiment

Next, a second embodiment of the invention is described with reference to FIG. 6 focusing on differences with the first embodiment.

Figure 6:
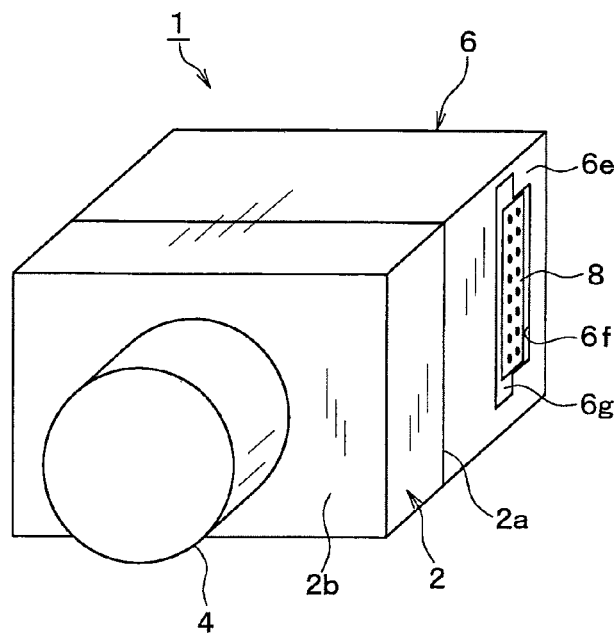
FIG. 6 is a perspective view of an actuator for brake fluid pressure control according to a second embodiment of the invention.

As shown in FIG. 6, in this embodiment, the case 6 is formed with the open part 6a in which the various electronic components including the electromagnetic valves 3 are accommodated, but is not formed with the open part 6b in which the connector 6b is disposed in the first embodiment. The circuit board 5 and the connector 8 are integrated in the lid part 6g for closing the insertion hole 6f, and electrical connection and data exchange with the outside are possible through the connector 8 exposed from the lid part 6g.

According to the second embodiment, since the open part 6b for accommodating the connector 8 as shown in FIGS. 1 to 3 can be eliminated, the structure of the case 6 can be simplified. Further, since the circuit board 5 and the connector 8 are integrated in the lid part 6g, the circuit board 5, the connector 8 and the lid part 6g can be fixed only by fixing the circuit board 5 to the stays 6 after inserting the lid part 6g into the insertion hole 6f together with the circuit board 5 and the connector 8. Hence, the manufacturing process of the actuator 1 can be simplified.

In the second embodiment, since the size of the circuit board 5 is small compared to the first embodiment, the circuit board 5 may be inserted into the case 6 from the open part 6a easier than in the first embodiment. However, since the connector 8 is integrated in the lid part 6g, it is difficult to insert the circuit board 5 into the case 6 from the open part 6a like in the first embodiment, and the foregoing problem occurs. Therefore, to obtain the same advantages as the first embodiment, it is necessary that the circuit board 5 can be inserted into the case 6 from the insertion hole 6f.

Third Embodiment

Next, a third embodiment of the invention is described with reference to FIG. 7 focusing on differences with the first embodiment.

Figure 7:
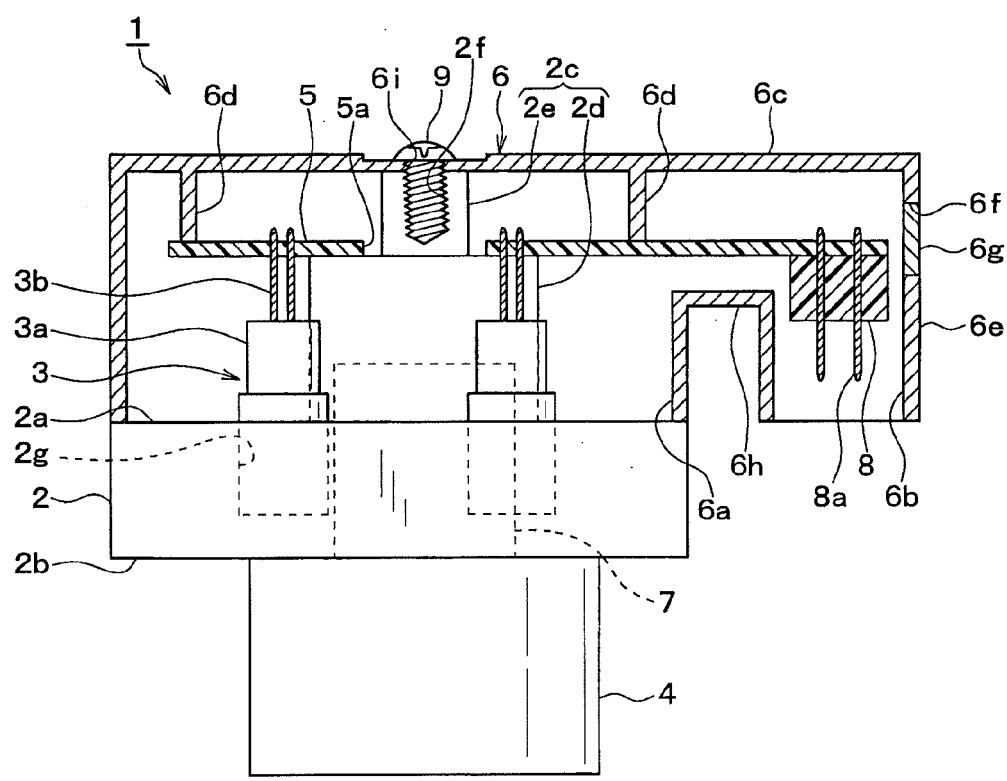
FIG. 7 is a perspective view of an actuator for brake fluid pressure control according to a third embodiment of the invention.

As shown in FIG. 7, in the third embodiment, the surface 2a of the block 2 is formed with a projecting part 2c projecting in the direction opposite to the motor 4, and the pump 7 is disposed inside the projecting part 2c. The projecting part 2c has a step shape in which the cross-sectional dimension in the direction perpendicular to the projecting direction thereof changes in two steps. More specifically, the projecting part 2c includes abase portion 2d having a large cross-sectional dimension on the side of the surface 2a, and a salient portion 2e projecting from the distal end of the base portion 2d beyond the circuit board 5 and having a small cross-sectional dimension. The salient portion 2e is located at the center of the base portion 2d such that the distal end of the salient portion 2d abuts against the inner wall surface of the case 6. A female screw hole 2f is formed in the distal end of the salient portion 2e. An opening 5a is formed in the circuit board 5 at a portion corresponding to the salient portion 2e. The case 6 is fixed to the block 2 by causing the salient portion 2e to abut against the surface 6c of the case 6 through the opening 5a, and screwing a screw 9 into the female screw hole 2f formed in the salient portion 2e through a hole 6i formed in the surface 6c.

According to the third embodiment, since the case 6 can be fixed to the block 2 at one point, the man-hours required for manufacturing the actuator 1 can be further reduced.

Other Embodiments

It is a matter of course that various modifications can be made to the above described embodiments as described below.

In the above embodiments, the case 6 is screw-fixed to the block 2. However, the case 6 may be fixed to the block 2 by swaging the block 2 around the open part 6a of the case 6, or welding the contact portion between the case 6 and the block 2 if the case 6 is made of metal.

In the above embodiments, the pump 7 is a rotary pump such as a trochoid pump. However, the pump 7 may be a plunger pump.

In the above embodiments, the insertion hole 6f is formed in the side surface 6e at the side of the connector 8. However, the insertion hole 6f may be formed in another side surface opposite to the connector 8, or the surface perpendicular to these surfaces.

The above explained preferred embodiments are exemplary of the invention of the present application which is described solely by the claims appended below. It should be understood that modifications of the preferred embodiments may be made as would occur to one of skill in the art.

What is claimed is:

1. An actuator for brake fluid pressure control comprising:
    a block formed with a brake pipe;
    an electric component provided on a surface of the block;
    a circuit board formed with an electric circuit for driving the electric component; and
    a case that houses the circuit board and includes a first open part in which the electric component is accommodated, the case having a top surface opposite the surface of the block across the circuit board and being fixed to the block at the side opposite to the top surface, characterized in that
    an insertion hole is formed in a side surface of the case at a position corresponding to a plane position of the circuit board, the side surface being constituted by a wall surface extending from an outer edge of the top surface toward the block, the insertion hole being closed by a lid part, and
    the insertion hole is sized to enable inserting the circuit board into the case therethrough to be fixed to the case.

2. The actuator for brake fluid pressure control according to claim 1, wherein
    the circuit board includes an extended portion which laterally extends beyond the block when viewed in the direction normal to the surface of the block,
    a connector electrically connected to the electric circuit is disposed in the extended portion, and
    the case includes a second open part formed so as to cover the extended portion while causing the connector to be exposed therethrough.

3. The actuator for brake fluid pressure control according to claim 2, wherein the insertion hole is formed at a position opposite to the connector.

4. The actuator for brake fluid pressure control according to claim 1, wherein the circuit board and the lid part are integrated in each other.

5. The actuator for brake fluid pressure control according to claim 1, further comprising a connector electrically connected to the electric circuit,
    the circuit board, the connector and the lid part being integrated in one another.

6. The actuator for brake fluid pressure control according to claim 1, wherein
    the circuit board is disposed so as to be parallel to the top surface,
    a plurality of stays are provided so as to project from the top surface toward the circuit board, and
    the circuit board is fixed to the case through the plurality of the stays.

7. The actuator for brake fluid pressure control according to claim 1, wherein the case is made of metal.

* * * * *